United States Patent
Oksman et al.

(10) Patent No.: US 10,482,106 B2
(45) Date of Patent: Nov. 19, 2019

(54) QUERYING A DATABASE USING RELATIONSHIP METADATA

(71) Applicant: salesforce.com, inc., San Francisco, CA (US)

(72) Inventors: Eugene Oksman, San Francisco, CA (US); Alexandre Hersans, San Francisco, CA (US)

(73) Assignee: Salesforce.com, Inc., San Francisco, CA (US)

(*) Notice: Subject to any disclaimer, the term of this patent is extended or adjusted under 35 U.S.C. 154(b) by 0 days.

(21) Appl. No.: 14/860,460

(22) Filed: Sep. 21, 2015

(65) Prior Publication Data

US 2016/0019287 A1 Jan. 21, 2016

Related U.S. Application Data

(63) Continuation of application No. 13/105,811, filed on May 11, 2011, now Pat. No. 9,141,690.

(60) Provisional application No. 61/334,684, filed on May 14, 2010.

(51) Int. Cl.
*G06F 16/28* (2019.01)
*G06F 16/245* (2019.01)
*G06F 16/33* (2019.01)
*G06F 16/335* (2019.01)

(52) U.S. Cl.
CPC .......... *G06F 16/285* (2019.01); *G06F 16/245* (2019.01); *G06F 16/283* (2019.01); *G06F 16/334* (2019.01); *G06F 16/335* (2019.01)

(58) Field of Classification Search
None
See application file for complete search history.

(56) References Cited

U.S. PATENT DOCUMENTS

| 5,577,188 A | 11/1996 | Zhu |
| 5,608,872 A | 3/1997 | Schwartz et al. |
| 5,649,104 A | 7/1997 | Carleton et al. |

(Continued)

OTHER PUBLICATIONS

Office Action from U.S. Appl. No. 13/105,811 dated Nov. 14, 2012, 21 pages.

(Continued)

*Primary Examiner* — Kris E Mackes
*Assistant Examiner* — Soheila (Gina) Davanlou
(74) *Attorney, Agent, or Firm* — Kwan & Olynick LLP

(57) ABSTRACT

Categorizing data in an on-demand database environment is provided. The categorized data is accessed to provide results based on statistical likelihood that records provide a desired result of a query. The categorization of the data includes organizing queries based on semantic terms, with categorization based on a multidimensional categorization of data in the database environment. The generating of results includes accessing relationship metadata both for individual records and for categories. Relationships along the same category, or among categories can provide records that may answer the query. The relationships and statistics are updated based on usage of the results data. Records and relationships identified as being used to solve the query, or being a desired solution to the query, can be weighted more heavily, thus increasing the likelihood of providing the most relevant data for subsequent queries.

20 Claims, 6 Drawing Sheets

(56) References Cited

U.S. PATENT DOCUMENTS

| | | |
|---|---|---|
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshaysky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,130,879 B1 | 10/2006 | Dayon |
| 7,340,411 B2 | 3/2008 | Cook |
| 7,620,655 B2 | 11/2009 | Larsson et al. |
| 8,843,536 B1 | 9/2014 | Elbaz et al. |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0066031 A1 | 4/2003 | Laane |
| 2003/0066032 A1 | 4/2003 | Ramachadran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0130976 A1 | 6/2003 | Au |
| 2003/0151633 A1 | 8/2003 | George et al. |
| 2003/0159136 A1 | 8/2003 | Huang et al. |
| 2003/0163485 A1 | 8/2003 | Goodwin et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0065925 A1* | 3/2005 | Weissman ......... G06F 17/30442 |
| 2005/0080613 A1* | 4/2005 | Colledge ............ G06F 17/2785 704/9 |
| 2005/0091098 A1 | 4/2005 | Brodersen et al. |
| 2007/0124276 A1 | 5/2007 | Weissman et al. |
| 2007/0266031 A1 | 11/2007 | Adams et al. |
| 2008/0071818 A1* | 3/2008 | Apanowicz ....... G06F 17/30448 |
| 2008/0086409 A1 | 4/2008 | Moorman et al. |
| 2008/0270462 A1* | 10/2008 | Thomsen .......... G06F 17/30545 |
| 2009/0076795 A1 | 3/2009 | Bangalore et al. |
| 2009/0119264 A1 | 5/2009 | Bostic et al. |
| 2009/0265221 A1* | 10/2009 | Woods .................. G06Q 30/00 705/7.29 |
| 2009/0282045 A1* | 11/2009 | Hsieh .................. G06F 21/6218 |
| 2010/0030734 A1 | 2/2010 | Chunilal |
| 2010/0036784 A1 | 2/2010 | Mishne et al. |
| 2010/0063959 A1* | 3/2010 | Doshi ............... G06F 17/30575 707/618 |
| 2010/0161663 A1 | 6/2010 | Patman Maguire |
| 2010/0257171 A1* | 10/2010 | Shekhawat ....... G06F 17/30707 707/738 |
| 2011/0004589 A1* | 1/2011 | Rischar ............. G05B 19/4185 707/713 |
| 2011/0106808 A1 | 5/2011 | Hersans et al. |
| 2011/0219021 A1 | 9/2011 | Litowitz |
| 2012/0137367 A1 | 5/2012 | Dupont et al. |

OTHER PUBLICATIONS

Final Office Action from U.S. Appl. No. 13/105,811 dated Jun. 5, 2013, 24 pages.

Office Action from U.S. Appl. No. 13/105,811 dated May 9, 2014, 24 pages.

Notice of Allowance and Fees from U.S. Appl. No. 13/105,811 dated May 18, 2015, 9 pages.

(56) References Cited

OTHER PUBLICATIONS

Final Office Action from U.S. Appl. No. 13/105,811 dated Jan. 28, 2015, 26 pages.

* cited by examiner

QUERYING A DATABASE USING RELATIONSHIP METADATA

RELATED CASES

This application is a continuation of and claims the benefit of the earlier filing date of non-provisional application Ser. No. 13/105,811 filed on May 11, 2011, entitled Methods And Systems For Categorizing Data In An On-Demand Database Environment, which claimed the benefit of the earlier filing date of provisional Application Ser. No. 61/334,684 filed on May 14, 2010.

FIELD

Embodiments described are related generally to database management, and embodiments described are more particularly related to categorizing and relating data in an on-demand database environment.

COPYRIGHT NOTICE/PERMISSION

Portions of the disclosure of this patent document may contain material that is subject to copyright protection. The copyright owner has no objection to the reproduction by anyone of the patent document or the patent disclosure as it appears in the Patent and Trademark Office patent file or records, but otherwise reserves all copyright rights whatsoever. The copyright notice applies to all data as described below, and in the accompanying drawings hereto, as well as to any software described below: Copyright© 2011, Salesforce.com Inc., All Rights Reserved.

BACKGROUND

Database systems and other systems often store a wealth of information. However, knowing where to search for data, or what data to access to solve a particular problem can be challenging. On the one hand, many users have a presumption that a solution exists somewhere in the cloud, referring to a network or group of networks. On the other hand, the more information that is created and stored makes finding the right information increasingly difficult. Add in the additional problems that traditional search is composed "backwards", and that different people use different terminology, and searching for a solution may not provide the results desired.

Traditional searching for a solution is usually "backwards" in that the search systems often require the user to select lists or groups of data for the solution. Such an approach misses the fact that a user usually does not know what s/he is looking for, and/or the data is often organized in a way different from how the user thinks about the problem. The user would prefer to simply be able to ask a question semantically and have an answer given. This leads into the other problem that different terms and phrases are used to mean the same thing, and a solution to the problem may be missed because the terminology used is different from that of the search. Thus, a user is implicitly expected to use the "right" search terms to get the desired solution.

An additional challenge is provided in the move to more modern database system architectures. In many conventional database systems, users access their data resources in one logical database, from a user's own systems. When a unitary database is accessed, system-wide conventions can be used for all users. Such assumptions about conventions and database system architecture are not appropriate for many modern and developing systems. Search and access may be further complicated from the system operation side when such assumptions no longer prove true.

BRIEF DESCRIPTION OF THE DRAWINGS

The following description includes discussion of figures having illustrations given by way of example of implementations of embodiments described. The drawings should be understood by way of example, and not by way of limitation. As used herein, references to one or more "embodiments" are to be understood as describing a particular feature, structure, or characteristic included in at least one implementation. Thus, phrases such as "in one embodiment" or "in an alternate embodiment" appearing herein describe various embodiments and implementations, and do not necessarily all refer to the same embodiment. However, they are also not necessarily mutually exclusive.

Figure 1:
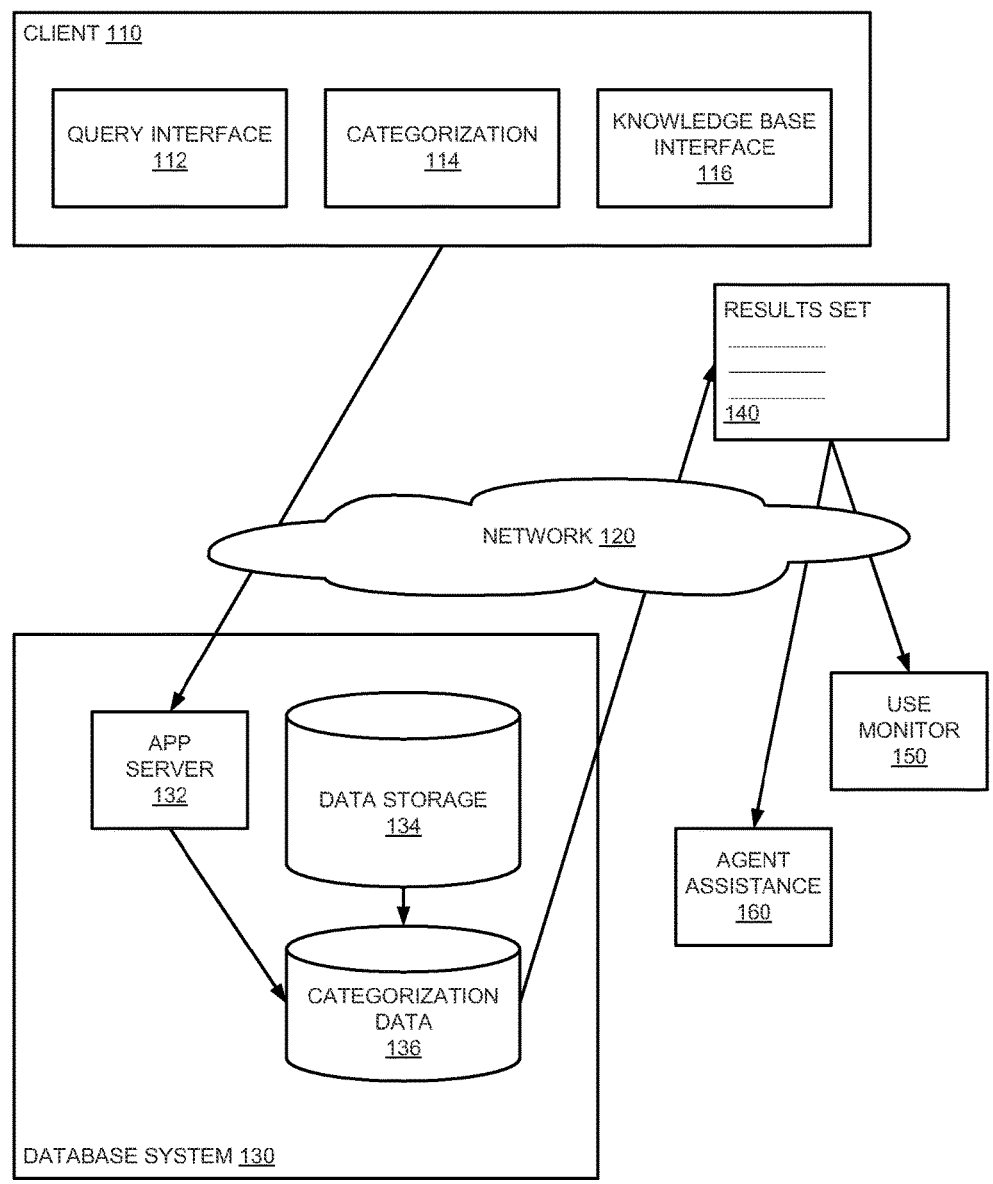
FIG. 1 is a block diagram of an embodiment of a system to categorize and relate records of data.

Descriptions of certain details and implementations follow, including a description of the figures, which may depict some or all of the embodiments described below, as well as discussing other potential embodiments or implementations of the inventive concepts presented herein. An overview is provided below, followed by a more detailed description with reference to the drawings.

DETAILED DESCRIPTION

As described herein, automatic categorizing data in an on-demand database environment is provided. The categorization of data is performed by the system to provide query results based on a statistical likelihood that the results provide a solution to the query. The statistical likelihood is informed by the categorization, and the monitoring of the usage of results in the system to solve problems. Thus, problems that are categorically similar, and/or have similar relationships to other records in the system, are likely solved by records found to provide solutions in the past.

Thus, the system "learns" by monitoring the results and the usage of the results. Categorization of the query in a semantic way allows the query to be captured exactly as it is generated by a user. The categorization is based on a multidimensional categorization of data in the database environment. The generating of results includes accessing relationship metadata both for individual records and for categories. Relationships along the same category, or among categories, can provide records that may answer the query or provide a solution. The relationships and statistics are updated based on usage of the results data. Records and relationships identified as being used to solve the query, or being a desired solution to the query, can be weighted more heavily, thus increasing the likelihood of providing the most relevant data for subsequent queries.

As described herein, the identification and use of relationship data provides a categorization methodology that can determine interests in a different field. For example, a user making a query about books about Mozart may receive results related to books about Mozart, and also results for books about Classical music, and/or also results for music by Mozart. Thus, multidimensional categorization with relationship data allows access to the same or different categories of data, and may provide better search results for a user. As the results are monitored for use and weighted based on "success" of the results, subsequent query results can be further improved. In one embodiment, it may be said that as described herein the potential query results are provided via application of hierarchical filtering. The filters may include rules related to the statistics of how data is used, and what relationship a record is expected to have (through metadata descriptions or definitions) to the query. Thus, many records can be identified as potential results, and then excluded through hierarchical filtering based on whether or not they are calculated to be potential results to the query.

Examples of multidimensional categorization may be found in U.S. Pat. No. 7,130,879 of Alexandre Dayon, entitled, "System for Publishing, Organizing, Accessing and Distributing Information in a Computer Network", and U.S. patent application Ser. No. 12/857,364 (Publication No. 2011/0106808) of Alexandre Hersans et al., entitled, "Multidimensional Content Organization and Delivery". Both references discuss the use of multiple categories and category dimensions.

With auto-categorization of data and matching queries to results as described herein, the great amount of data stored on systems can be used to provide better and better results to queries. The users do not need to know beforehand where to search for data, and can use an interface that is much more natural, rather than working backwards as previously done. The user is able to simply submit a request and be provided with results that should be close to what the user is looking for.

To the extent that the results are not what are sought by the user, in one embodiment, the system can automatically direct a query to a human agent. For example, the system may ask the user if a solution was found among the results. If not, the user may be automatically sent to a human agent to resolve the issue. In one embodiment, the actions by a human agent are also leveraged in the system learning. The system can identify relationships and records used by the agent to solve the problem, and add those solutions to the system. Thus, every time an agent assists with a solution, it makes the system better able to automatically solve subsequent problems or provide solutions for subsequent queries.

In one embodiment, the system monitors results usage through questions to the user ("did this provide the solution you were looking for?" or other questions) and/or through monitoring which records are accessed, for how long, and is there subsequent access to the records. Through the process of monitoring and/or receiving feedback from the user, the system may be able to relate different terms that appear different, but carry the same meaning, such as a user typing in "BlackBerry Bold" and another user typing in "BB Bold". BLACKBERRY products are available from RESEARCH IN MOTION of Waterloo, Ontario, Canada. All trademarks used herein are the sole property of their respective owners, and are used herein solely for purposes of identification of product examples. Thus, whether a user types in one phrase or the other, the system can have the two phrases related, and provide similar results to each query.

In one embodiment, the system providing the query results is a multitenant database. The multitenant database provides a "cloud architecture" that allows a user to query for data in a modern database system. As referred to herein, a multitenant database stores data for multiple client organizations, which are each identified by a tenant ID. One or more users can be associated with each tenant ID. The one or more users of each client organization access data identified by the tenant ID associated with the respective client organization. The multitenant database is typically a database stored and hosted remote from the client organization. Typically, the multitenant database is hosted by an entity (e.g., company) separate from the client organization. A multitenant database system (MTS) as described herein can be said to provide on-demand database services. An MTS is typically a hosted system that provides as much database storage and service as required by each tenant.

In an MTS implementation, each tenant ID may have a set of data associations and relationships. Thus, a query on the MTS for one tenant ID may produce different results than the identical query on the MTS for a different tenant ID. In one embodiment, the architecture of each tenant ID develops separately with custom configuration for each tenant. For example, a UDD (user defined database) may be implemented for each tenant to store relationships and categorization data.

Thus, there is provided an on-demand database environment such as a multitenant database system where the database environment stores relationship and categorization data. Received queries are categorized, and relationship data is accessed for the categorizations. The relationship data can include metadata for categorizations that indicate relationships to other categorizations, as well as metadata for records, which indicates relationships to other records, whether of the same or a different categorization. The system, such as through an application server of the database, computes a statistical likelihood that records are solutions to the query. In one embodiment, only records that have a threshold statistical likelihood are displayed as results, and others are excluded. Thus, records are provided as query results, as determined by computing a statistical likelihood as indicated by categorization data and relationship data.

The system updates the statistics based on user access to the results. In one embodiment, the access and use of the results are monitored by the system, which allows the system to weight the relationships and records that are accessed by the user.

FIG. 1 is a block diagram of an embodiment of a system to categorize and relate records of data. System 100 includes a client that accesses a remote database system over a network. More particularly, client 110 accesses database system 130 over network 120.

Client 110 represents any type of client device that may access database system 130, for example, a desktop or laptop computer, a tablet, smartphone, server, or other computing device. Network 120 includes any type of network access that allows client 110 to access database system 130. Network 120 may be or include any one or more networks such as local or wide area networks, wireless or wired, encrypted (e.g., virtual private network (VPN)) or open, on any of a variety of know or proprietary protocols, or other network. Network 120 is understood to include hardware and software components to enable remote connection of one device to another.

Database system 130 represents an on-demand database environment. As an on-demand environment, database system 130 provides to client 110 the quantity of database resources needed, and when they are needed. As such, database system 130 appears as a scalable database resource to client 110. In one embodiment, database system 130 has at least one aspect of its configuration that is configurable and scalable for different tenants.

Client 110 includes query interface 112, which can represent software and hardware components that allow a user of client 110 to present a query to database system 130. For example, query interface 112 may include one or more input fields that may accept user-input queries. Traditional systems include lists from pull-down menus for a user to select a category. With auto-categorization, the system categorizes the data based on the input query, rather than requiring a user to guess through multiple layers of options to select something that may sound like a solution to the problem.

In one embodiment, categorization of queries is performed, at least in part, at a categorization engine of client 110. Thus, categorization 114 represents an implementation where one or more components of categorization exist at client 110. In an alternate implementation, most or all categorization components may exist at the server side, rather than at client 110. Examples of splitting the categorization components may include, for example, parsing the query, and sending the parsed query to database system 130. Categorization 114 also represents the fact that queries are categorized and results provided to the client based on the categorizations. In one embodiment, categorization 114 represents components through which the system prompts a user to suggest categories or categorization of the query.

Client 110 includes knowledge base interface 116. Interface 116 represents hardware and software that allows client 110 to communicate with database system 130, but more specifically to access and utilize information from the knowledge base of the database. Interface 116 may also include monitoring features that allow system 100 to update performance based on use of the results provided to queries.

Client 110, through interface 116, sends a query to application server 132 of database system 130. Application server 132 represents control hardware and software components that interface with clients and provide data access and processing services to the clients. Application server 132 may be one of many application servers in database system 130. Application server 132 categorizes the query via use of categorization data 136.

Whether a categorization is selected or suggested by the user, or whether application server 132 provides all services to auto-categorize the query, application server 132 additionally enhances the determination of what records to provide as a results set based on relationship data. Categorization data 136 may include one or more tables of data that identifies relationships that are used by application server 132 to identify and compute a statistical likelihood that a certain record is a solution to the query.

Data storage 134 represents the data of the database system, and may be a multitenant database or other data store. It will be understood that fundamentally, data stored is simply data. A database is a framework of how that data is stored, structured, and interpreted when stored and accessed. Thus, a database may be considered, in one embodiment, as a set of rules and procedures for storing, accessing, and manipulating data.

Application server 132 provides results set 140 to client 110, which includes one or more records or objects that are determined to be potential answers or solutions to the query. In one embodiment, use monitor 150 monitors use of results set 140 by a user. For example, the system may determine what results were accessed, and whether they were used to solve the issue or problem of the query.

In one embodiment, if results set 140 does not include an element that is deemed by the user to resolve the query, the user may indicate through a button press or other selection that the results do not provide a solution. In such a case, system 100 may automatically forward the query for agent assistance 160. Agent assistance 160 specifically refers to assistance from a human user. Thus, if the categorization and use of relationship data does not provide a solution to the problem, interaction with a human user may provide a better chance to find a solution. If a solution is found, system 100 can automatically add the solution to the knowledge base of database system 130. The solution can produce additional information used to modify the relationship statistics of the system. Each use and solution provides additional information to make it more likely that subsequent queries will be responded to with better results.

In one embodiment, results set 140 only includes elements that reach a threshold level of statistical likelihood of being a solution. Thus, for example, if application server 132 determines that the statistical likelihood of a record being a potential solution is lower than a threshold, the result or item is excluded from results set 140. The specific threshold will be specific to each implementation, and will depend on a total size of the database, the number of initial results determined, the configuration of how many results the system is trying to provide. Other factors may also be considered in determining a threshold.

In one embodiment, the query itself entered by the user is stored in database system 130 as a new record. The new record could then to be provided with relationships to other queries, and be used as a result for subsequent queries.

While specific reference is made above to system 100, in general, as implemented herein, data categorization in a multidimensional system and relationships of data allow a system to provide improved query results.

There are several use cases where the system may perform learning necessary to provide improved query results. Those use cases may include where a user enters a query, the system categorizes the data related to the query, and the user approves the categorization. The approved categorization allows the system to know that the categorization is correct, which can help improve the successful providing of query results. Similarly, if a user enters a query and no solution is provided, when the user tries again, the information of the user trying again indicates what results are not the desired solution. Those results may be weighted more lightly for subsequent queries. If a user describes a problem, an agent can enter the query, and either the agent or the system categorizes it. The information provides an indication of what may be a solution to the problem. In each case, the data can be more or less heavily weighted depending on whether it is used or accessed, and whether it provides a solution to problem.

In one embodiment, the system includes a category selection API (application programming interface). The API allows the programmatic manipulation of data category selections on individual records. In one embodiment, only create( ) and delete( ) methods are enabled for the categories, but no update( ) or other change or modification related methods are available. Thus, relationships can be added or deleted, but are not changed. The API can enable a tool to synchronize data category associations across multiple systems, and may be available via Apex and web services.

In one embodiment, the API exposes data category associations that are stored in a category data table. Objects marked as categorizable in a UDD have counterpart associated entities with a specified suffix. Thus, categorizable data is identified in the system. In one embodiment, the associated entity (not the object itself) is then used to manipulate the data category selections via the API.

In one embodiment, an API call is used to retrieve a structure of a specific category group. The results are the categories available to the user requesting the information. A user will not be able to query, create, or delete categories in the Category Selection API that are not available in the describe call. Examples of information retrieved from such an API call are the ID, developer name, label of visible data category, or other information. In one embodiment, the category selection is a kind of a child object of its parent record (the entity in the associated entity). In one embodiment, access restrictions are placed upon the methods of the categories. Thus, proper profile permissions may be needed to perform a read or change on a category selection operation.

Figure 2:
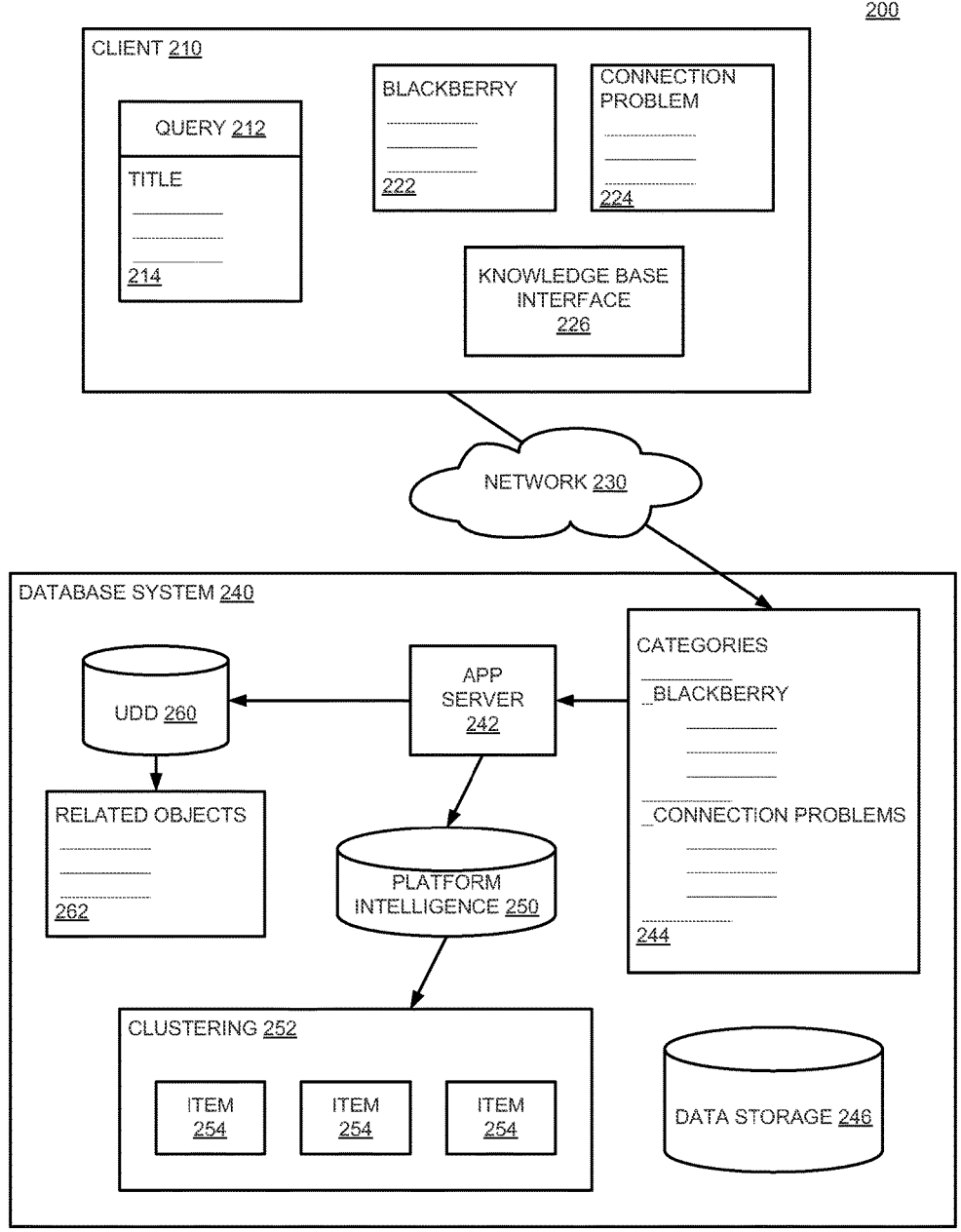
FIG. 2 is a block diagram of an embodiment of a system to respond to queries based on data categorization.

FIG. 2 is a block diagram of an embodiment of a system to respond to queries based on data categorization. System 200 may be one example of a system according to system 100 of FIG. 1. System 200 includes client 210, through which a user inputs query 212. Query 212 is a request for information or a request for a solution to a problem. In one embodiment, query 212 is a natural language query, where the user is able to submit the query exactly as the problem presents itself, and leverage the auto-categorization and relationship data to find a solution.

In one embodiment, query 212 has a format 214 of a title, which is the problem as indicated by the user, and other potential information. The title refers to an embodiment where the query is stored as a record, and the query statement is the title of the record. The other information may include user information for the user that created the query, additional details about a product that is the subject of the query, or other information.

As an example, consider that the query is: "I can't connect to the web with my BB Bold". In such a case, key expressions parsed out of the query may be the connection and the product. Thus, categorization of the query may include BlackBerry 222, and Connection Problem 224. It will be understood that multiple categorizations may be applicable to each query. Each categorization may include information about the category, such as records or relationships associated with the categorization.

In one embodiment, categorizing the query includes using categories according to a multidimensional categorization system. A multidimensional categorization system refers to a system where data can be related or referenced to other elements along multiple separate axes, or points of organization. Thus, instead of simply being a flat organization of data where all data elements exist on an equal level, the multidimensional categorization allows categories and subcategories, as well as allowing the connection of data elements to each other, while not being connected to other data elements. Thus, data can be accessed along multiple different lines of search or access, rather than through traditional use of common columns of data elements common to all records. In one embodiment, categorization may include receiving an indication of a first category in a first category dimension, where data along the first category dimension can then be retrieved. Other categories can exist within the first category dimension, and other category dimensions can also exist. Each category dimension allows for a possible access path to data records.

Client 210 includes knowledge base interface 226, components that allow the client device to access the knowledge information of the database system. The knowledge base refers generally to the collection of knowledge and understanding reflected in the data stored in database system 240. Client 210 access database system 240 through network 230, which may include local and/or wide area (e.g., the Internet) networks.

System 200 is illustrated with query 212 categorized in accordance with categories 244 in database system 240. Application server 242 may process the categories (with or without input from client 210, other than query 212, in response to receiving query 212. The categories are the same as shown in client 210, with BlackBerry and Connection Problems shown on the list. In one embodiment, other categories (not shown) may be produced.

In one embodiment, application server 242 accesses UDD (user defined database) 260 to access metadata about related objects 262. Related objects 262 are objects that have related queries and/or related solutions to a category of query 212. UDD 260 allows for a particular organization to set up its desired information table configuration. A UDD for each tenant ID of database system 240 may be included, which could make each categorization system unique for each tenant ID.

Application server 242 accesses platform intelligence 250 to identify and access records related to the query. In one embodiment, the records selected are initially all records related to any category and relationship. The records can then be excluded based on information of UDD 260. In one embodiment, application server 242 performs clustering 252, with different items 254 clustered together. There may be more than one cluster group. The cluster groups identify records that are related based on metadata identifying the items as related items. Items 254 may be related based on being synonyms, being used together, having a parent-child relationship, having a similar architecture, or any other type of relationship that may be identified. Each item identifies a product and/or a feature of a product, a solution, a problem, or some other item that may be related to another.

In one embodiment, various products or items are related by a common item that appears as a solution to different queries. Thus, for example, if Query A is generated by a user and is resolved by Item 1, and Query B different than Query A is generated by a user and also resolved by Item 1, Query A and Query B may be related due to having a common item that resolved them. If a user is looking for an answer to something similar to Query A, call it Query A', the information of both Query A and Query B may be useful in resolving Query A'.

The relationships may simply be used to determine what records to access for generating a query. However, in one embodiment, the data is clustered for cross-dimensional relatedness for responding to subsequent queries.

Data storage 246 represents the overall data store of database system 240, and may be divided as a multitenant database. Thus, UDD 260, and platform intelligence 250, as well as categories 244 will be understood as example instances for a particular tenant ID. A similar architectural "look" at system 200 would exist for each different tenant ID. Different tenant IDs will likely produce different data in distinct instances of the platform. Thus, the UDD, categorizations, and platform intelligence associated with one tenant ID may be distinct from that of other tenant IDs.

Figure 3:
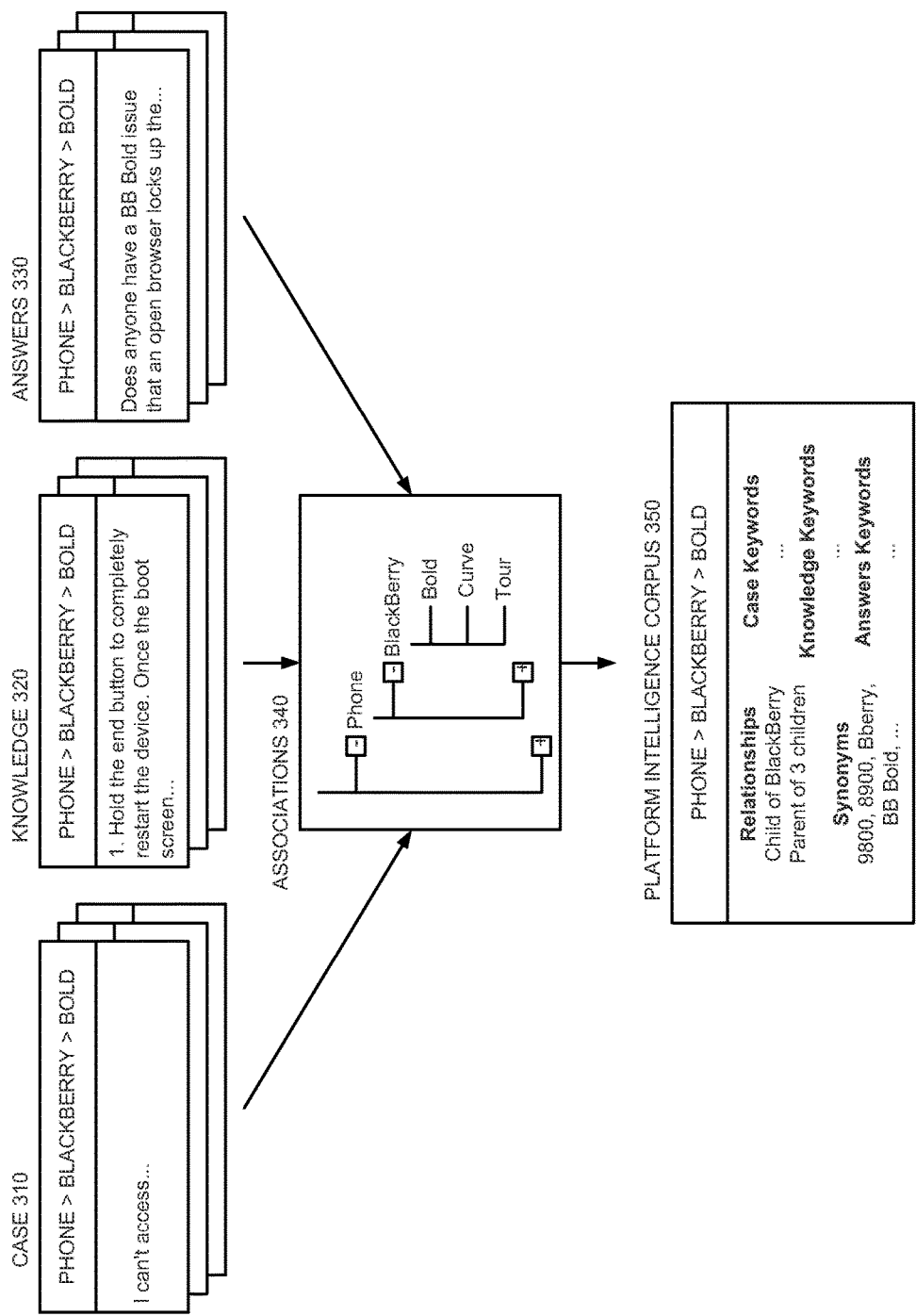
FIG. 3 is a block diagram of an embodiment of data categories relating data records.

FIG. 3 is a block diagram of an embodiment of data categories relating data records. Associations 340 illustrate one example of a categorization of data in system. Under "Phone" is BlackBerry, and under BlackBerry are "Bold", "Curve", and "Tour". There may be other categories along the same dimension as Phone.

Case 310 illustrates cases specifically for BlackBerry Bold, the top one shown being an indication of a problem with access on the BlackBerry Bold. Similarly, knowledge 320 and answer 330 include information specifically related to the BlackBerry Bold. The top example of knowledge 320 is a proposed solution to try restarting the device. The top example of answers 330 is an article related to an open browser causing a freezing problem. Each record in each of case 310, knowledge 320, and answers 330 may include information related to the BlackBerry Bold.

In generating a results list of potential solutions for a user, a system may also access similar records related to a BlackBerry Tour, especially if similar problems and/our solutions are noted in the system. Additionally, some of the records listed are listed due to recognition that they are related to the BlackBerry Bold, even without specifically identifying "BlackBerry Bold".

For example, platform intelligence corpus 350 represents the body of platform intelligence for the BlackBerry Bold, and may include relationships to other records, related as Relationships, Synonyms, Case keywords, Knowledge keywords, or Answers keywords. Relationships for the BlackBerry Bold may be articles or records related more generally to BlackBerry, which is a parent, or may be specific models of the Bold as children of BlackBerry Bold. The Synonyms may include model numbers "9800" or "8900" as well as shorthand notations "Bberry" and "BB Bold". Other relationships may exist.

Additionally, in one embodiment, case keywords, knowledge keywords, and/or answers keywords may include additional relationship data for the platform intelligence related to the BlackBerry Bold. The relationships and categorizations associate data together in ways that allow a database system to provide results in response to queries in a more efficient way than possible in previous systems.

Figure 4:
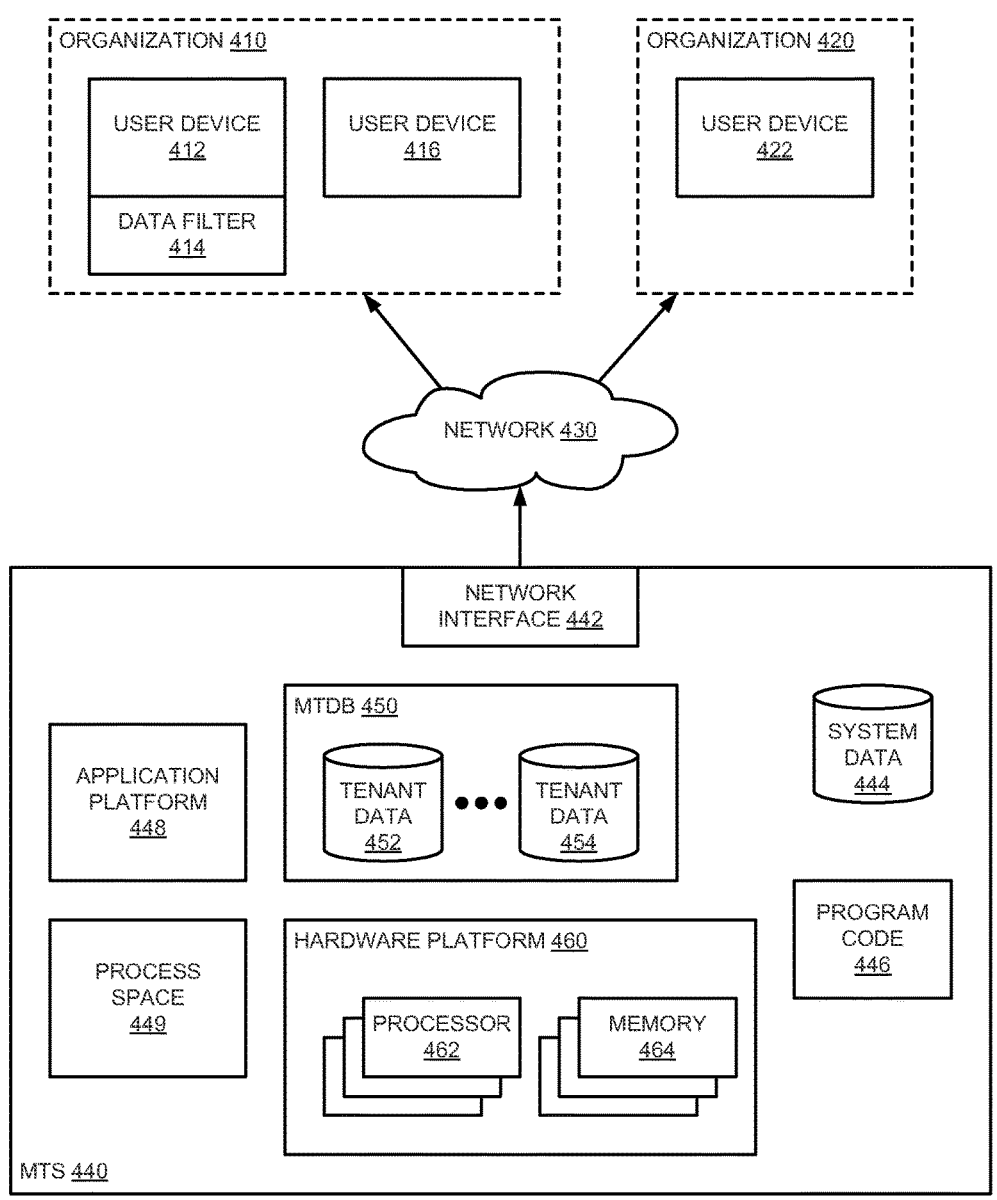
FIG. 4 is a block diagram of an embodiment of an environment for on-demand database services.

FIG. 4 is a block diagram of an embodiment of an environment for on-demand database services. Environment 400 includes components related to an on-demand database service. Environment 400 includes multitenant database system (MTS) 440 and one or more organizations 410 and 420, which are tenants of the MTS. Each organization can include one or more users and/or user devices.

MTS 440 provides on-demand database services for environment 400. An on-demand database service, such as provided by MTS 440, is a database system that is made available to an outside user as needed by the user (e.g., on the demand of the user). Thus, a user does not necessarily need to be concerned with building and/or maintaining the database system, and rather can simply store and access data as needed from a remotely operated database system.

In one embodiment, MTS 440 stores information from one or more tenants into tables of a common database image or multitenant database (MTDB) 450. Accordingly, MTS 440 provides on-demand database service. A database image may include one or more database objects. A multitenant database stores data for various different tenants or organizations in a single database instance. Resources (such as memory, processing space, processing hardware, and other resources of the database system) are shared or allocated among the different tenants.

Multitenant database 450 includes tenant data 452, . . . , 454. The tenant data may be divided into different storage areas, which can be a physical and/or a logical arrangement of data. In one embodiment, multitenant database 450 is accessed via a relational database management system (RDBMS) or the equivalent, which executes storage and retrieval of information against the database object(s). In one embodiment, multitenant database 450 is accessed via an object-oriented database management system (OODBMS) or the equivalent. In one embodiment, multitenant database 450 is accessed via an object-relational database management system (ORDBMS) or the equivalent. It will be understood that an RDBMS manages data stored in the database based on a relational model, where data and data relationships are stored in tables. An OODBMS includes at least some integration of a database with an object-oriented programming language, and data is stored in the database in the same mode of representation as is provided in the programming language. An ORDBMS implements both a relational model and an object-oriented model, storing data in tables, and allowing representation of data consistent with a programming language.

Application platform 448 represents a framework that allows applications of MTS 440 to execute. Thus, application platform 448 includes the software components (such as an operating system) to allow execution of the applications. Hardware platform 460 provides hardware resources to enable the applications to execute on application platform 448, as well as enabling execution of management or control logic for MTS 440. In one embodiment, application platform 448 of MTS 440 enables creation, managing, and executing one or more applications developed by the provider of the on-demand database service, users accessing the on-demand database service via network 430, or third party application developers accessing the on-demand database service via network 430.

MTS 440 represents any type of system that may provide on-demand database service. In addition to application platform 448 and hardware platform 460, which includes processor resources 462 and memory resources 464, MTS 440 may include other components. MTS 440 includes network interface 442 to enable user devices to access MTS 440 over network 430. In one embodiment, MTS 440 includes system data 444, program code 446, and process space 449. System data 444 represents data specific to the running of MTS 440, rather than being tenant data. It is logically separated from the tenant storage, and may be physically separated (e.g., by designating storage areas or address ranges for system data). Program code 446 represents code to implement various functions of MTS 440, which enable the system to provide on-demand database service. Process space 449 represents a framework for executing MTS processes and tenant-specific processes, such as running applications as part of an application hosting service. Additional processes that may execute on MTS 440 include database indexing processes. It will be understood that MTS 440 may include more or fewer components than what is illustrated.

As mentioned above, environment 400 includes organizations 410 and 420, which represent tenants of MTS 440. Each organization may include one or more individual, and may be an individual or small company, up to a large corporation or organization. Thus, it will be understood that the number of user devices associated with each organization could potentially be hundreds or even thousands. Each organization is assigned a tenant identifier (ID) within MTS 440. Each tenant ID could have certain associated properties for use, depending on how the organization is configured. User device 422 is associated with organization 420, and access MTS 440 under the tenant ID of organization 420.

Similarly, user devices 412 and 416 are associated with organization 410, and access MTS 440 under the tenants ID assigned to organization 410.

User devices 412, 416, and 422 may be any machine or system that is used by a user to access a database user system. For example, any of the user devices can be a handheld computing device, a mobile phone, a laptop computer, a work station, and/or a network of computing devices. Each user device can be provided with an on-demand database service from MTS 440 via network 430.

Within an organization, users may be further given access privileges and/or restrictions, as illustrated by data filter 414. As illustrated, user device 416 may access MTS 440 in accordance with whatever access is available to organization 410, while user device 412 has additional restrictions applied by data filter 414. In one embodiment, data filter 414 may additionally or alternatively provide specific user interface features for user 412 in accessing data from MTS 440.

The users of user devices 412, 416, and 422 may differ in their respective capacities, and the capacity of a particular user device might be entirely determined by permissions (permission levels) for the current user. For example, where a salesperson is using a particular user device to interact with MTS 440, that user device has the capacities assigned to that salesperson. However, an administrator using the same user device may have different capacities assigned to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level. Such enforcement could occur based on data filter 414, which can filter per device and/or could filter for the entire organization (e.g., a central filter as opposed to distributed filtering).

Network 430 represents any network or combination of networks. A network is generically an interconnection of devices that communicate with each other. Network 430 can be or include any combination of a LAN (local area network), WAN (wide area network), telephone network, wireless network, point-to-point network, star network, token ring network, hub network, or other appropriate configuration. TCP/IP (Transfer Control Protocol and Internet Protocol) networks are commonly used, such as the global internetwork of networks often referred to as the "Internet." Reference to specific networks in certain examples herein is meant only to provide examples, and is not limiting.

In one embodiment, user devices 412, 416, 422 (and other user devices not shown) communicate with MTS 440 over network 430 using TCP/IP and, at a higher network level, use other common protocols to communicate, such as HTTP (HyperText Transfer Protocol), FTP (File Transfer Protocol), AFS (Andrew File System—a distributed network filesystem using trusted servers), WAP (Wireless Access Protocol). In an example where HTTP is used, user device 412 might include an HTTP client commonly referred to as a "browser" for sending and receiving HTTP messages to and from an HTTP server at MTS 440 (not specifically shown, but which could be executed on hardware platform 460). Such an HTTP server might be implemented as the sole network interface between MTS 440 and network 430, but other techniques might be used as well or instead. In one embodiment, the interface between MTS 440 and network 430 includes load sharing functionality, such as round-robin HTTP request distributors to balance loads and distribute incoming HTTP requests evenly over a plurality of servers. At least as for the users that are accessing that server, each of the plurality of servers has access to data in MTS 440; however, other alternative configurations may be used instead.

In one embodiment, MTS 440 implements a web-based customer relationship management (CRM) system. For example, in one embodiment, MTS 440 includes application servers configured to implement and execute CRM software applications as well as provide related data, code, forms, webpages and other information to and from user devices (e.g., 412, 416, 422) and to store to and retrieve from a database system related data, objects, and webpage content. With a multitenant system, data for multiple tenants may be stored in the same physical database object; however, tenant data is typically arranged so that data of one tenant is kept logically separate from that of other tenants. The logical separation prevents one tenant from having access to another tenant's data. An express sharing of data among tenants is possible, which removes the logical separation. In one embodiment, MTS 440 implements applications other than or in addition to a CRM application. For example, MTS 440 may provide tenant access to multiple hosted (standard and custom) applications, including a CRM application. User (or third party developer) applications, which may or may not include CRM, may be supported by application platform 448, which manages creation, storage of the applications into one or more database objects and executing of the applications in a virtual machine in process space 449 of MTS 440.

In one embodiment, MTS 440 is configured to provide webpages, forms, applications, data and media content to user (client) device to support the access by user devices as tenants of MTS 440. In one embodiment, MTS 440 provides security mechanisms to keep each tenant's data separate unless the data is shared. More than one MTS may be used. If more than one MTS is used, the multiple systems may be located in close proximity to one another (e.g., in a server farm located in a single building or campus), or they may be distributed at locations remote from one another (e.g., one or more servers located in city A and one or more servers located in city B).

As used herein, each MTS could include one or more logically and/or physically connected servers distributed locally or across one or more geographic locations. Additionally, the term "server" refers to a computer system, including processing hardware and process space(s), and an associated storage system and database application (e.g., OODBMS, RDBMS, ORDBMS) as is known in the art. It will be understood that "server system" and "server" are often used interchangeably herein. Similarly, a database object described herein can be implemented as single databases, a distributed database, a collection of distributed databases, a database with redundant online or offline backups or other redundancies, and might include a distributed database or storage network and associated processing intelligence or logic.

Figure 5:
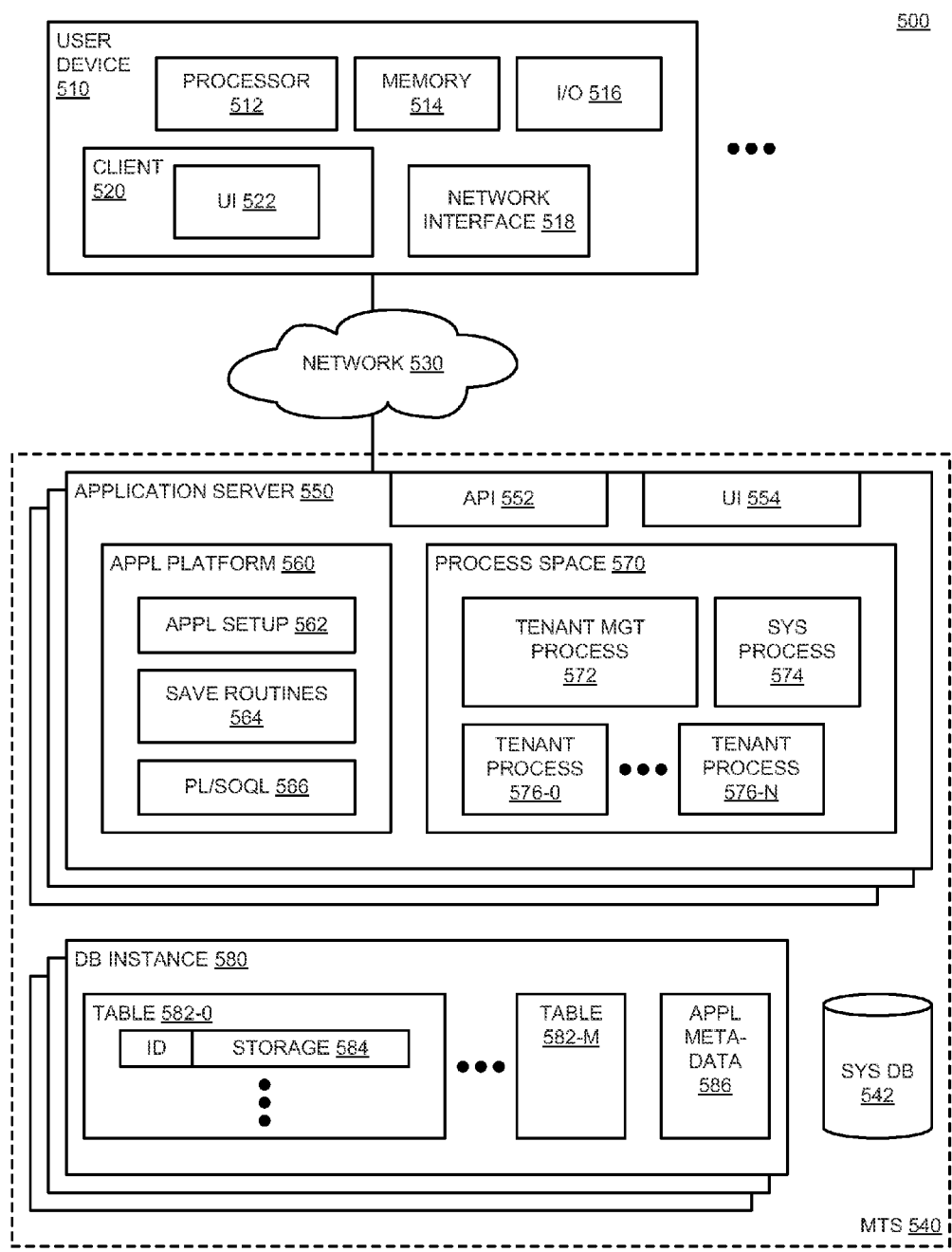
FIG. 5 is a block diagram of an embodiment of an environment for on-demand database services with a multitenant database having multiple data tables.

FIG. 5 is a block diagram of an embodiment of an environment for on-demand database services with a multitenant database having multiple data tables. Environment 500 includes components related to providing an on-demand database service, and may be one example of environment 400 of FIG. 4, with additional components shown. Environment 500 includes one or more multitenant database systems (MTS) 540 and one or more tenants of the MTS, as illustrated by user device 510. User device 510 is generally part of an organization that is the tenant, and user device 510 provides a computing device through which access to MTS 540 is available. MTS 540 provides on-demand database services for environment 500.

Environment 500 may include conventional, well-known elements that are explained only briefly here. For example, user device 510 (and any other user devices through which users access MTS 540) could include a desktop personal computer, workstation, laptop, handheld device, cell phone or smart phone, or any wireless access protocol (WAP) enabled device or any other computing device capable of interfacing directly or indirectly to the Internet or other network connection.

User device 510 includes processor 512, which represents one or more processor devices, and may be any combination of one or more processors. Processor 512 provides hardware means to execute programs and applications on user device 510. Memory 514 represents a memory system for user device 510, and may be any combination of one or more memory devices, short term, and/or long term memory. I/O (input/output) 516 represents any type of input and output devices such as keyboards, pointers and controllers, touchscreens, buttons, microphones, or other input mechanisms, and monitors, screens, printers, interfaces to networks, and/or other output devices.

User device 510 includes network interface 518, which represents hardware interconnections and control logic and circuitry to enable user device 510 to connect to network 530. Network interface 518 also has associated drivers and possibly other software components to allow user programs to interface with the interconnection hardware. User device 510 includes client 520, which represents a program that allows a user of user device 510 to access information from network 530, such as accessing MTS 540. UI 522 represents a user interface component of client 520, or a user interface in which information from client 520 is presented on user device 510. Thus, UI 522 may be integrated with client 520, or it may be separate from client 520, but display data related to the execution of client 520. UI 522 is rendered on display or user interface hardware or device, which can be understood to be represented by UI 522.

In one embodiment, user device 510 runs an HTTP client as client 520. An HTTP client may be, for example, a browsing program or a browser, which may include a WAP-enabled browser in the case of a cell phone, PDA or other wireless device. The HTTP client allows a user (e.g., subscriber of MTS 540) of user device 510 to access, process, and view information, pages, and applications available from MTS 540 over network 530, based on permissions and privileges. The user interface device of user device 510 can be used to access data and applications hosted by MTS 540, and to perform searches on stored data, and otherwise allow a user to interact with various GUI (graphical user interface) pages that may be presented to a user.

Similar to what is discussed above with reference to network 430 of environment 400, network 530 represents any network or group of networks over which access can be provided to MTS 540. Network 530 may include switching and/or routing elements, cables, connectors, and other components. In one embodiment, at least part of network 530 is the Internet, referring to a specific global internetwork of networks. However, it should be understood that other networks can be used in addition to or instead of the Internet, such as an intranet, an extranet, a virtual private network (VPN), a non-TCP/IP based network, any LAN or WAN or other network.

In one embodiment, user devices such as user device 510 (which may be client systems) communicate with application server 550 to request and update system-level and tenant-level data from MTS 540 that may require sending one or more queries to tenant data storage in database instance 580 and/or system data in system database 542. In one embodiment, MTS 540 (e.g., application server 550) automatically generates one or more SQL statements (e.g., one or more SQL queries) designed to access the desired information. System data storage in system database 542 may generate query plans to access the requested data from database instance 580.

In one embodiment, MTS 540 includes one or more application servers 550. From one perspective, application server 550 can be considered a network interface of MTS 540 to connect to network 530. Application server 550 exchanges (i.e., receives and/or transmits) data with network 530, such as receiving requests and sending replies or sending data. Application servers 550 may share hardware resources for interfacing with network 530, or they may be assigned separate resources. In one embodiment, one or more of application servers 550 can be implemented as an HTTP application server.

In one embodiment, each application server 550 is configured to handle requests for any user associated with any organization that is a tenant. Thus, a request from user device 510 could be received and processed at any application server 550. There may be advantages to avoiding affinity for a user and/or an organization or tenant to a specific application server 550, such as the ability to add and remove application servers from a server pool at any time for any reason, as well as for workload balancing among the servers. In an implementation where user and/or tenant affinity is used, an application server could not be removed without completing its jobs and/or handing off users to another server.

In one embodiment, an interface system implementing a load balancing function (e.g., an F5 Big-IP load balancer) is communicably coupled between application servers 550 and the user devices to distribute requests to the application servers 550. In one embodiment, the load balancer uses a least connections algorithm to route user requests to the application servers 550. Other examples of load balancing algorithms, such as round robin and observed response time, also can be used. For example, in certain embodiments, three consecutive requests from the same user could hit three different application servers 550, and three requests from different users could hit the same application server 550. In this manner, MTS 540 is multitenant, wherein MTS 540 handles storage of, and access to, different objects, data, and applications across disparate users and organizations. In one embodiment, Each application server 550 includes elements to provide database access service and request processing. Application server 550 includes API (application programming interface) 552 and UI 554. UI 554 represents server-side components that provide user interface elements that are provided to user device 510 for display. API 552 provides an interface for users and/or developers to access resident processes of MTS 540.

In one embodiment, application server 550 includes application (appl) platform 560, which provides a sub-environment on which applications hosted by application server 550 can be executed. Application platform 560 may include an operating system or other control logic, as well as business logic and common routines for use by the applications. As illustrated, application platform 560 includes application setup mechanism 562 that supports creation and management of applications, including configuration, by application developers, which may be saved as metadata into tenant data storage of database (db) instance 580. Save routines 564 represent the mechanisms used to store data in database instance 580, such as storing the application setup metadata. Such applications can be executed by subscriber users, for example, in process space 570.

In one embodiment, invocations to or related to such applications may be coded using PL/SOQL (Procedural Language Salesforce Object Query Language) that provides a programming language style interface extension to API 552. Thus, PL/SOQL 566 is capable of serving as a procedural extension to an on-demand database centric service API that allows flow control and transaction control to execute on a server in conjunction with database APIs (e.g., SOQL, data manipulation language (DML), or others). PL/SOQL 566 can enable the capability to thread together multiple SOQL/DML statements as a single unit of work on the server. PL/SOQL 566 need not necessarily be considered a general purpose programming language, seeing that it may be implemented as heavily data focused, but is not necessarily implemented that way. In one embodiment, PL/SOQL 566 can be used by developers to interlace with an on-demand database system, in contrast to traditional application developers' conventional tools, such as PL/SQL (Structured Query Language) of ORACLE, Inc. of Redwood Shores, Calif., and others.

In one embodiment, PL/SOQL 566 includes variable and expression syntax, block and conditional syntax, loop syntax, object and array notation, pass by reference, and other syntax known to other programming languages. Thus, full control over syntax and the ability to reference dynamic schema elements is provided with a new language and runtime for database services. Where embedded concepts that interface with on-demand database applications are provided, syntax and semantics that are easy to understand and which encourage efficient use of database APIs may also be employed. In one embodiment, PL/SOQL 566 is implemented as a strong typed language with direct (non-quoted) references to schema objects such as Object and Field names (both standard and custom).

More details about PL/SOQL language embodiments is discussed in commonly owned U.S. Provisional Patent Application 60/828,192 entitled, PROGRAMMING LANGUAGE METHOD AND SYSTEM FOR EXTENDING APIS TO EXECUTE IN CONJUNCTION WITH DATABASE APIS, by Craig Weissman, filed Oct. 4, 2006, now expired, which is incorporated in its entirety.

In one embodiment, invocations to applications may be detected by one or more system processes, which manage retrieving application metadata 586 for the subscriber making the invocation and executing the metadata as an application in a virtual machine. Metadata 586 provides data related to access and/or use of data stored in database instance 580. In one embodiment, metadata is stored in a separate table within database instance 580, and in an alternative embodiment, metadata 586 is stored with other data elements of user storage (such as with user storage 584 of table 582-0.

In one embodiment, application server 550 includes process space 570, which may include tenant process spaces 576-0 through 576-N (for some integer number N of process spaces configured in application server 550), tenant management process space 572 and system process space 574. It will be understood that process space 570 is an abstraction to illustrate the resources allocated for execution of processes (e.g., programs or applications) within application server 550. The skilled reader recognizes that memory and processor and other hardware resources may need to be allocated, as well as software resources to support the execution of a process. The processes may be executed as separate threads, or may share a thread. In one embodiment, the number N of tenant processes is equal to a number of subscriber tenants. In another embodiment, the number N of tenant processes may be higher than the number of subscriber tenants. Tenant management process 572 provides management of the other processes, including determining when certain processes execute. System process 574 executes operations related to functions of MTS 540.

Each application server 550 may be configured to tenant data storage in database instance 580 and the tenant data stored therein, and to system data storage of system database 542 and the system data stored therein to serve requests of user devices. As mentioned above, in one embodiment, tenant data is separated logically, and stored in the same multitenant database. In one embodiment, database instance 580 stores data in tables 582-0 through 582-M, where M is some integer number of tables. In one embodiment, different tables store data of different types. Application metadata 586 may be implemented as a separate table. Alternatively, one of the tables 582-0 through 582-M could be a table that stores varying types of objects, which are defined through metadata stored in the table.

In one embodiment, database instance is further implemented with user storage space distinct (e.g., identifiable) from its associated tenant. Thus, for example, user data may include the tenant ID, as well as an identifier specific to a user. Thus, storage 584 may represent either or both of tenant storage or user storage. For example, a copy of a user's most recently used (MRU) items might be stored to in user storage within database instance 580. Similarly, a copy of MRU items for an entire organization that is a tenant might be stored to a tenant storage area of database instance 580. In one embodiment, the tenant data and the system data (as illustrated by system database 542) are stored in separate databases.

Application servers 550 may be communicably coupled to database systems, e.g., having access to system database 542 and tenant database instance 580, via a different network connection. For example, one application server may be coupled via a network (e.g., the Internet), another application server might be coupled via a direct network link, and another application server might be coupled by yet a different network connection. The application servers may connect to the database systems via TCP/IP or another transport protocol, at least partially depending on the network interconnect used.

Regarding storage in database instance 580, one tenant might be a company that employs a sales force where each salesperson uses MTS 540 to manage their sales process. Thus, a user might maintain contact data, leads data, customer follow-up data, performance data, goals and progress data, and other data, all applicable to that user's personal sales process (e.g., storage 584, which may be tenant storage). Thus, all of the data and the applications to access, view, modify, report, transmit, calculate, or perform other operations can be maintained and accessed via a user device having nothing more than network access. In an example of an MTS arrangement, the user can manage his or her sales efforts and cycles from any of many different user devices. For example, if a salesperson is visiting a customer and the customer has a lobby with Internet access, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by MTS 540 that are allocated at the tenant level while other data structures might be managed at the user level. Because MTS 540 may support multiple tenants including possible competitors, MTS 540 should have security protocols that keep data, applications, and application use separate. Additionally, because many tenants may opt for access to an MTS rather than maintain their own system, redundancy, up-time, and backup are additional functions that may be implemented in MTS 540. In addition to user-specific data and tenant specific data, MTS 540 may also maintain system level data usable by multiple tenants or other data. Such system level data might include industry reports, news, postings, and the like that are sharable among tenants.

In one embodiment, each database instance 580 can be viewed as a collection of objects, such as a set of logical tables, containing data fitted into predefined categories. A "table" is one representation of a data object, and may be used herein to simplify the conceptual description of objects and custom objects according to what is described herein. It should be understood that "table" and "object type" may be used interchangeably herein. Each table generally contains one or more data categories logically arranged as columns or fields in a viewable schema. Each row or record of a table contains an instance of data for each category defined by the fields.

For example, a CRM database may include a table that describes a customer with fields for basic contact information such as name, address, phone number, fax number, or other information. Another table might describe a purchase order, including fields for information such as customer, product, sale price, date, or other fields. In one embodiment, a multitenant database has standard entity tables for use by all tenants. For CRM database applications, such standard entities might include tables for Account, Contact, Lead, and Opportunity data, each containing pre-defined fields. Thus, tables 582-0 through 582-M may include standard, defined tables.

In one embodiment, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", teaches systems and methods for creating custom objects as well as customizing standard objects in a multitenant database system. In one embodiment, for example, all custom entity data rows are stored in a single multitenant physical table, which may contain multiple logical tables per organization. It is transparent to customers that their multiple "tables" are in fact stored in one large table or that their data may be stored in the same table as the data of other customers.

Figure 6:
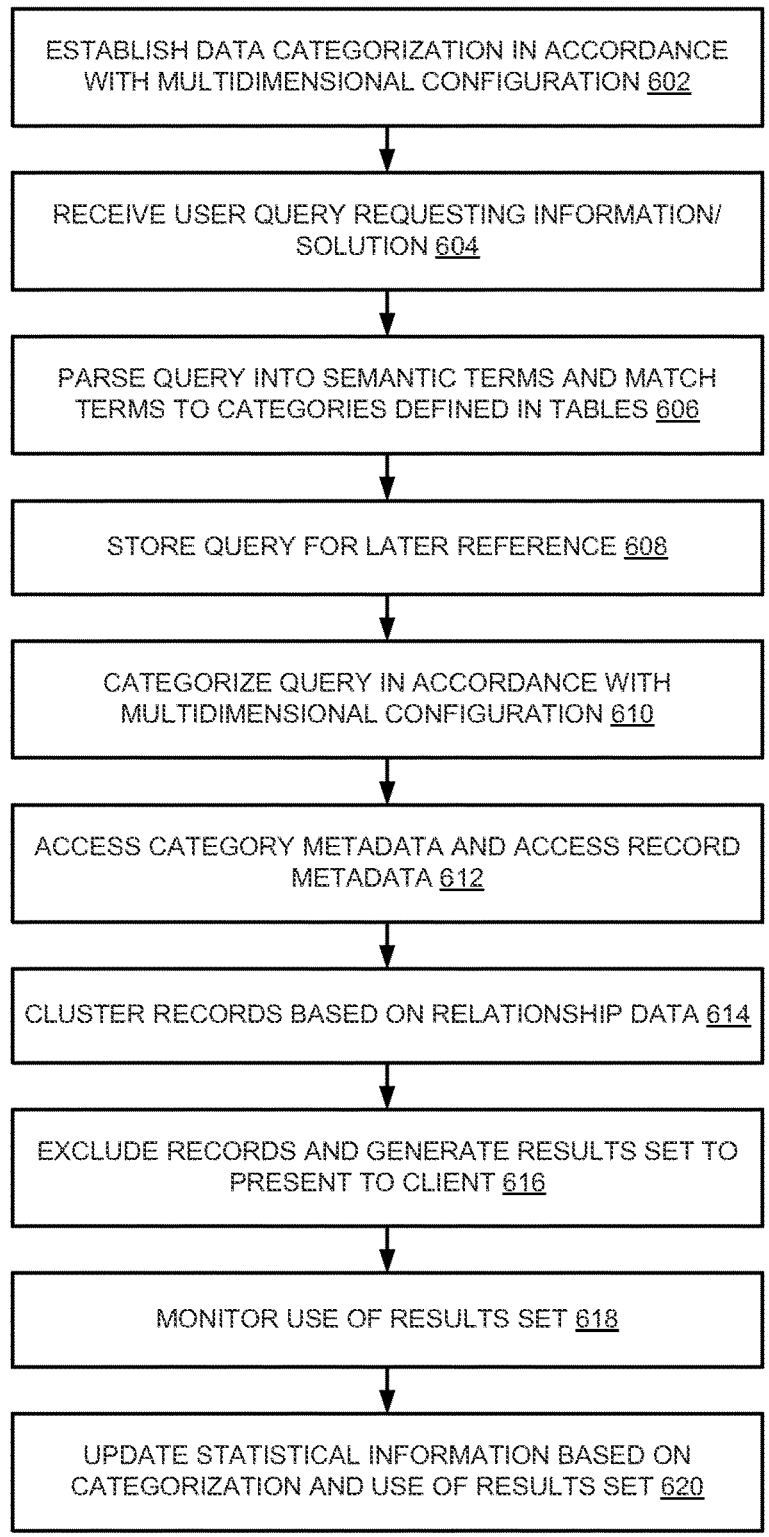
FIG. 6 represents a flow diagram of an embodiment of accessing data in response to a query based on data categorization and relationships.

FIG. 6 represents a flow diagram of an embodiment of accessing data in response to a query based on data categorization and relationships. Flow diagrams as illustrated herein provide examples of sequences of various process actions. Although shown in a particular sequence or order, unless otherwise specified, the order of the actions can be modified. Thus, the illustrated implementations should be understood only as an example, and the process can be performed in a different order, and some actions may be performed in parallel. Additionally, one or more actions can be omitted in various embodiments; thus, not all actions are required in every implementation. Other process flows are possible.

In general, a multidimensional categorization system is configured in a database environment, and allows system learning and improved query results. The problem or issue statement can be captured exactly as described by the customer. The system then semantically analyzes the query and proposes categorizations with record categories such as articles and answers. If the case is automatically resolved by the automated system, the case can be forwarded to a human agent for resolution. Relevant case changes are recorded in the cloud, improving the knowledge base of the cloud-architecture database system.

More specifically, embodiments of operations are described as follows with reference to the drawing. An on-demand database environment such as a multitenant database system is configured to include data categorization. The data categorization is established in the system in accordance with a multidimensional configuration, 602. The system receives a user query requesting information or a solution to an issue or problem, 604.

In one embodiment, the system, for example through an application server, parses the query into semantic terms and matches the terms to categories defined and stored in tables, 606. There may be specific tables defined and populated with information related to categorization and searching of data. In one embodiment, the query is stored in the system (such as in the tables) for later reference or use as a query result, 608. The query itself and/or the parsing and/or the categorization of terms can be stored in the system to inform subsequent categorizations.

The system categorizes the query in accordance with the multidimensional configuration, 610. The system accesses category metadata and record metadata, 612. In one embodiment, the metadata informs the categorization of the data. In another embodiment, data is accessed during the categorization, and is then reduced or filtered by excluding data from it.

In one embodiment, records for responding to the query may be clustered based on relationships, 614. Data presented to the user as proposed responses to the query are thus based on categorization and relationship data, providing proposed organization of data while at the same time responding to a query. Whether or not the query was successful can provide information about how the database should be organized.

As mentioned above, in one embodiment, records can be excluded from being in a results set sent to the client, 616. In one embodiment, the system monitors use of the results, 618. The monitoring may include receiving specific information from the clients regarding use of the data. Alternatively, the accessing or not of the data can be the monitoring. In one embodiment, the monitoring includes determining whether or not the user requests another query on the same subject, which would suggest that the query results were not successful.

The system updates the statistical information of the system, 620, including updating metadata related to the categorization and use of the results; thus, the system should continue to improve its generation of results.

Various operations or functions are described herein, which may be described or defined as software code, instructions, configuration, and/or data. The content may be directly executable ("object" or "executable" form), source code, or difference code ("delta" or "patch" code). The software content of the embodiments described herein may be provided via an article of manufacture with the content stored thereon, or via a method of operating a communications interface to send data via the communications interface. A machine readable medium or computer readable medium may cause a machine to perform the functions or operations described, and includes any mechanism that provides (i.e., stores and/or transmits) information in a form accessible by a machine (e.g., computing device, electronic system, or other device), such as via recordable/non-recordable storage media (e.g., read only memory (ROM), random access memory (RAM), magnetic disk storage media, optical storage media, flash memory devices, or other storage media) or via transmission media (e.g., optical, digital, electrical, acoustic signals or other propagated signal). A communication interface includes any mechanism that interfaces to any of a hardwired, wireless, optical, or other medium to communicate to another device, such as a memory bus interface, a processor bus interface, an Internet connection, a disk controller. The communication interface can be configured by providing configuration parameters and/or sending signals to prepare the communication interface to provide a data signal describing the software content.

Various components described herein may be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications may be made to the disclosed embodiments and implementations without departing from their scope. Therefore, the illustrations and examples herein should be construed in an illustrative, and not a restrictive sense.

What is claimed is:

1. A method comprising:
    classifying a database query into a designated one or more of a plurality of categories specified in a multidimensional categorization scheme via a processor, each category having one or more category dimensions, each category dimension providing a respective access path to records in the database, the database including a first plurality of records retrieved in response to queries and a second plurality of records storing queries, each of the first plurality of records being classified into a respective one or more of the plurality of categories based on one or both of a content of the record and a respective relationship metadata entry generated for the record, the respective relationship metadata entry being generated based on whether the respective record successfully or unsuccessfully answered any one or more of the queries stored as records, the relationship metadata entry including:
        category relationship metadata identifying one or more relationships among the designated one or more categories and a respective one or more of the plurality of categories, wherein the relationships includes a first relationship type metadata to indicate a record relationship to another record in a multi-tenant database system (MTS) and a second relationship type metadata to indicate a category relationship to other available categories of the multidimensional categorization scheme associated with a user's tenant ID in the multitenant database system; and
        record relationship metadata identifying relationships between the record and other records in the database, including other records classified as belonging to a same one or more categories into which the record was classified; and
    retrieving one or more records from the database based on the database query, the retrieved records including a first one or more records that are related to any of the one or more categories, the retrieved records including a second one or more records that are related to the first one or more records based on the record relationship metadata;
    for one or more of the retrieved records, computing a statistical likelihood that the record represents a solution to the query meriting inclusion in a result set for the query; and
    transmitting via a communication interface a query response that includes only the subset of retrieved records for which the statistical likelihood exceeds a designated threshold.

2. The method recited in claim 1, the method further comprising:
    accumulating usage statistics for a designated retrieved record based on user actions associated with the retrieved record in response to the database query, including determining whether the retrieved record successfully or unsuccessfully answered the database query; and
    updating the respective relationship metadata record for the retrieved record based on the accumulated usage statistics.

3. The method recited in claim 2, wherein computing a statistical likelihood that the record represents a solution to the query meriting inclusion in a result set for the query is computed based on the accumulated usage statistics.

4. The method recited in claim 1, the method further comprising:
    accessing a cluster group identifying additional relationships between the retrieved records and other records in the database, the additional relationships based on relationship metadata identifying a category or record as having related items, each related item representing data that can be related to data contained in the retrieved records; and
    responsive to the query retrieving records identified as having relationships to the retrieved records based on accessing the cluster group.

5. The method recited in claim 4, wherein the related items can be any one or more of data identifying a product, feature, solution, and problem in a knowledge base associated with the database.

6. The method recited in claim 4, wherein returning the subset of the retrieved records includes returning the subset of the retrieved records remaining after excluding those records determined not likely to successfully answer the query based the relationship metadata accessed in the cluster group.

7. The method recited in claim 1, wherein the database is hosted by the MTS, the MTS storing data in the database for multiple tenants, each tenant's data segregated from other tenants' data using a unique tenant identifier, wherein each relationship metadata entry is stored in a respective user defined database associated with the unique tenant identifier.

8. A computer system including a database system, the database system configurable to perform a method comprising:

classifying a database query into a designated one or more of a plurality of categories specified in a multidimensional categorization scheme via a processor, each category having one or more category dimensions, each category dimension providing a respective access path to records in the database, the database including a first plurality of records retrieved in response to queries and a second plurality of records storing queries, each of the first plurality of records being classified into a respective one or more of the plurality of categories based on one or both of a content of the record and a respective relationship metadata entry generated for the record, the respective relationship metadata being generated based on whether the respective record successfully or unsuccessfully answered any one or more of the queries stored as records, the relationship metadata entry including:

category relationship metadata identifying one or more relationships among the designated one or more categories and a respective one or more of the plurality of categories, wherein the relationships includes a first relationship type metadata to indicate a record relationship to another record in a multi-tenant database system (MTS) and a second relationship type metadata to indicate a category relationship to other available categories of the multidimensional categorization scheme associated with a user's tenant ID in the multitenant database system; and record relationship metadata identifying relationships between the record and other records in the database, including other records classified as belonging to a same one or more categories into which the record was classified; and retrieving one or more records from the database based on the database query, the retrieved records including a first one or more records that are related to any of the one or more categories, the retrieved records including a second one or more records that are related to the first one or more records based on the record relationship metadata;

for one or more of the retrieved records, computing a statistical likelihood that the record represents a solution to the query meriting inclusion in a result set for the query; and transmitting via a communication interface a query response that includes only the subset of retrieved records for which the statistical likelihood exceeds a designated threshold.

9. The computer system recited in claim 8, the method further comprising:

accumulating usage statistics for a designated retrieved record based on user actions associated with the retrieved record in response to the database query, including determining whether the retrieved record successfully or unsuccessfully answered the database query; and updating the respective relationship metadata record for the retrieved record based on the accumulated usage statistics.

10. The computer system recited in claim 9, wherein computing a statistical likelihood that the record represents a solution to the query meriting inclusion in a result set for the query is computed based on the accumulated usage statistics.

11. The computer system recited in claim 8, the method further comprising:

accessing a cluster group identifying additional relationships between the retrieved records and other records in the database, the additional relationships based on relationship metadata identifying a category or record as having related items, each related item representing data that can be related to data contained in the retrieved records; and responsive to the query retrieving records identified as having relationships to the retrieved records based on accessing the cluster group.

12. The computer system recited in claim 11, wherein the related items can be any one or more of data identifying a product, feature, solution, and problem in a knowledge base associated with the database.

13. The computer system recited in claim 11, wherein returning the subset of the retrieved records includes returning the subset of the retrieved records remaining after excluding those records determined not likely to successfully answer the query based the relationship metadata accessed in the cluster group.

14. The computer system recited in claim 8, wherein the database is hosted by the MTS, the MTS storing data in the database for multiple tenants, each tenant's data segregated from other tenants' data using a unique tenant identifier, wherein each relationship metadata entry is stored in a respective user defined database associated with the unique tenant identifier.

15. The one or more non-transitory computer readable storage media having instructions stored thereon for performing a method, the method comprising:

classifying a database query into a designated one or more of a plurality of categories specified in a multidimensional categorization scheme via a processor, each category having one or more category dimensions, each category dimension providing a respective access path to records in the database, the database including a first plurality of records retrieved in response to queries and a second plurality of records storing queries, each of the first plurality of records being classified into a respective one or more of the plurality of categories based on one or both of a content of the record and a respective relationship metadata entry generated for the record, the respective relationship metadata being generated based on whether the respective record successfully or unsuccessfully answered any one or more of the queries stored as records, the relationship metadata entry including:

category relationship metadata identifying one or more relationships among the designated one or more categories and a respective one or more of the plurality of categories, wherein the relationships includes a first relationship type metadata to indicate a record relationship to another record in a multi-tenant database system (MTS) and a second relationship type metadata to indicate a category relationship to other available categories of the multidimensional categorization scheme associated with a user's tenant ID in the multitenant database system; and record relationship metadata identifying relationships between the record and other records in the database, including other records classified as belonging to a same one or more categories into which the record was classified; and retrieving one or more records from the database based on the database query, the retrieved records including a first one or more records that are related to any of the one or more categories, the retrieved records including a second one or more records that are related to the first one or more records based on the record relationship metadata;

for one or more of the retrieved records, computing a statistical likelihood that the record represents a solution to the query meriting inclusion in a result set for the query; and transmitting via a communication interface a query response that includes only the subset of retrieved records for which the statistical likelihood exceeds a designated threshold.

16. The one or more non-transitory computer readable storage media recited in claim 15, the method further comprising:

accumulating usage statistics for a designated retrieved record based on user actions associated with the retrieved record in response to the database query, including determining whether the retrieved record successfully or unsuccessfully answered the database query; and updating the respective relationship metadata record for the retrieved record based on the accumulated usage statistics.

17. The one or more non-transitory computer readable storage media recited in claim 16, wherein computing a statistical likelihood that the record represents a solution to the query meriting inclusion in a result set for the query is computed based on the accumulated usage statistics.

18. The one or more non-transitory computer readable storage media recited in claim 15, the method further comprising:

accessing a cluster group identifying additional relationships between the retrieved records and other records in the database, the additional relationships based on relationship metadata identifying a category or record as having related items, each related item representing data that can be related to data contained in the retrieved records; and responsive to the query retrieving records identified as having relationships to the retrieved records based on accessing the cluster group.

19. The one or more non-transitory computer readable storage media recited in claim 18, wherein the related items can be any one or more of data identifying a product, feature, solution, and problem in a knowledge base associated with the database.

20. The one or more non-transitory computer readable storage media recited in claim 18, wherein returning the subset of the retrieved records includes returning the subset of the retrieved records remaining after excluding those records determined not likely to successfully answer the query based the relationship metadata accessed in the cluster group.

* * * * *